(12) United States Patent
Bloxsom et al.

(10) Patent No.: US 7,954,575 B1
(45) Date of Patent: Jun. 7, 2011

(54) LEADER STRING PULL-THROUGH MACHINE

(76) Inventors: Joel O. Bloxsom, Henderson, NV (US); Jason M. Romine, Traverse City, MI (US)

( * ) Notice: Subject to any disclaimer, the term of this patent is extended or adjusted under 35 U.S.C. 154(b) by 322 days.

(21) Appl. No.: 12/207,651

(22) Filed: Sep. 10, 2008

(51) Int. Cl.
*B61B 13/10* (2006.01)

(52) U.S. Cl. ..... 180/9.1; 180/9.5; 104/138.1; 104/138.2

(58) Field of Classification Search .................. 180/9.1, 180/9.5; 104/138.1, 138.2
See application file for complete search history.

(56) References Cited

U.S. PATENT DOCUMENTS

| | | | | |
|---|---|---|---|---|
| 3,604,042 A * | 9/1971 | Bremner et al. | ............ | 15/104.13 |
| 3,800,358 A * | 4/1974 | Ryan | ............................ | 15/312.1 |
| 4,677,865 A * | 7/1987 | Lehmann | ..................... | 73/866.5 |
| 4,770,105 A * | 9/1988 | Takagi et al. | .............. | 104/138.2 |
| 5,142,990 A * | 9/1992 | Leonard | ..................... | 104/138.2 |
| 6,089,339 A * | 7/2000 | Willis | .......................... | 180/9.46 |
| 6,450,104 B1 * | 9/2002 | Grant et al. | ................ | 104/138.2 |
| 6,887,014 B2 * | 5/2005 | Holland | ..................... | 405/184.1 |
| 7,188,568 B2 * | 3/2007 | Stout | ........................... | 104/138.2 |
| 7,348,892 B2 * | 3/2008 | Rodney | ...................... | 340/853.1 |
| 7,363,989 B2 * | 4/2008 | Ueland et al. | .................. | 175/51 |
| 2008/0167752 A1 * | 7/2008 | Jacobsen | ..................... | 700/250 |

* cited by examiner

*Primary Examiner* — Joanne Silbermann
*Assistant Examiner* — Michael R Stabley
(74) *Attorney, Agent, or Firm* — Northern Michigan Patent Law, PLC

(57) ABSTRACT

A crawler device for pulling a leader string through electrical or cable conduit. The crawler device has a traction head, for example using caterpillar-type rubber tracks, biased outwardly into contact with the inner wall of the conduit when inserted in the conduit. The traction head pulls its own motor and power supply behind it, serially and flexibly linked to follow the traction head and negotiate curves in the typically small diameter electrical conduit. In the preferred from, the power supply is a series of linked batteries, such that the crawler is an independently and self-sufficiently mobile machine traveling through the conduit.

11 Claims, 5 Drawing Sheets

LEADER STRING PULL-THROUGH MACHINE

FIELD OF THE INVENTION

The invention is in the field of devices for pulling leader string for electrical wiring through an electrical conduit.

BACKGROUND OF THE INVENTION AND DESCRIPTION OF RELATED ART

Electricians and cable installers commonly use a device known as a "fish tape" to help install wiring or cable in an empty conduit. The fish tape is typically a stiff metal or plastic tape fed from a reel with a hand crank to push it through the empty conduit until the free end of the tape sticks out the other end of the conduit. A "leader string" (a term which includes string, cord, lightweight wire, or any other equivalent used for the same purpose) is attached to the free end of the tape, which has a built-in string attachment structure such as a hook or clip, and then the installer rewinds the tape until the leader string has been pulled back through the conduit. The exposed end of the leader string is then attached to a wire or cable, and then the other end of the leader string is used to pull the wiring or cable (hereafter "wiring") back through the conduit.

Experience shows fish tapes to be heavy, difficult to wind and unwind, slow, and tiring to use when long runs of conduit are being wired.

BRIEF SUMMARY OF THE INVENTION

According to the invention, a leader string pull-through device is provided in the form of a small powered tractor device, hereafter referred to as a "crawler", with wheels or treads held in traction against the inside wall of an electrical or cable conduit to crawl through the conduit while pulling a leader string. The crawler is small enough and flexible enough to negotiate typical conduit diameters and curves, and in the preferred form has a jointed, multi-part structure led by a rubber-treaded traction head that pulls its motor drive and power supply after it.

In a further aspect, the crawler's traction head has two or more opposed caterpillar-type tracks or wheel carriages (hereafter "tracks"), the tracks biased into constant contact with opposing sides of the conduit's inner wall for good traction. In the preferred embodiment the crawler head has three crawler tracks, "opposed" in the sense that they are equally forced apart from one another relative to a central axis to provide a balanced drive force against the inner wall of the conduit.

In a further aspect, the multi-part crawler includes separate but flexibly coupled crawler head, motor, and power supply portions. In yet a further aspect, the crawler head uses a belt-and-pulley type drive, with a worm gear operated by a single in-line motor following the crawler head. In still a further aspect, the motor is powered by one or more in-line batteries flexibly coupled to follow the motor.

The motor can be directly coupled to the crawler head drive, or can be connected to the drive through a gear reduction mechanism. Various parts of the crawler "train" can be combined, provided sufficient flexibility is maintained to negotiate curves in the conduit. For example, it might be possible to build the motor into the crawler head to directly drive the tracks.

These and other features and advantages of the invention will become apparent from the detailed description below, in light of the accompanying drawings.

DETAILED DESCRIPTION OF THE INVENTION

Figure 1:
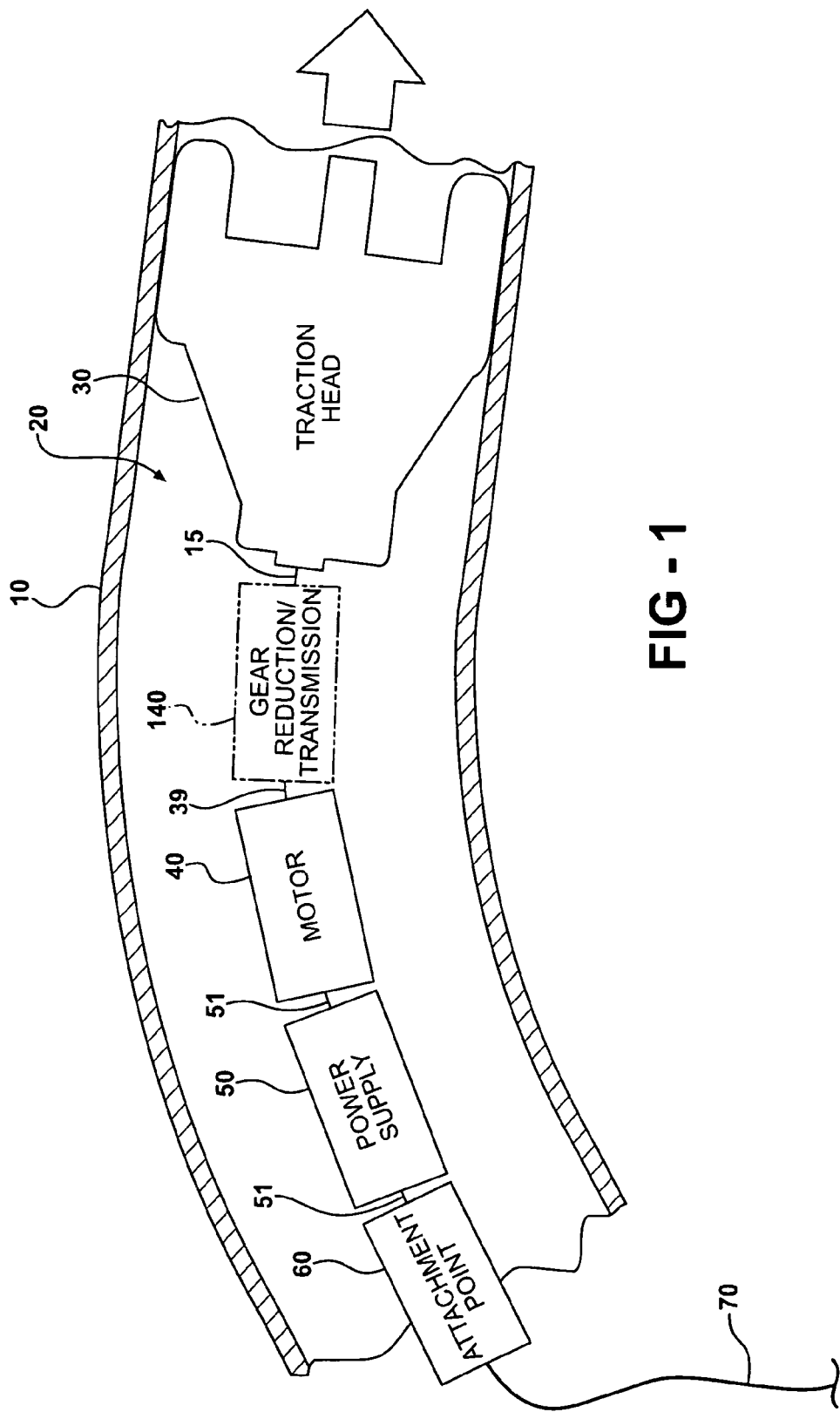
FIG. 1 is a cutaway side view of a section of electrical wiring conduit, with a schematic representation of a crawler apparatus according to the invention inside the conduit.

Referring first to FIG. 1, the invention is illustrated schematically as crawler device 20 running inside a standard size electrical wiring conduit 10, for example 1-inch diameter metal or plastic conduit of the type used to protect the wiring in common residential and commercial building construction, or any other similar type of electrical tubing including but not limited to flexible metallic tubing. Crawler 20 includes a traction head 30 in constant tractive engagement with the inner wall of conduit 10. Traction head 20 is coupled to and pulls an electric motor 40 that drives traction head 20 through a flexible drive coupling 39, and optionally also through a gear reduction transmission 140. Motor 40 is in turn flexibly coupled to pull along a power supply 50, which in the preferred form is one or more batteries 50 electrically and mechanically coupled to each other and to motor 40 at electromechanical couplings 51.

An attachment point 60 is mechanically coupled to and follows power supply 50, and can be any attachment device suitable for securing a leader string 70 so that the leader string can be pulled through a substantial run of conduit 10 by crawler 20. Attachment point 60 can be any known mechanical, magnetic, or adhesive attachment, and it will be understood that leader string 70 can take any known form light enough and with sufficiently low friction to be pulled through conduit 10 by crawler 20.

Figure 2:
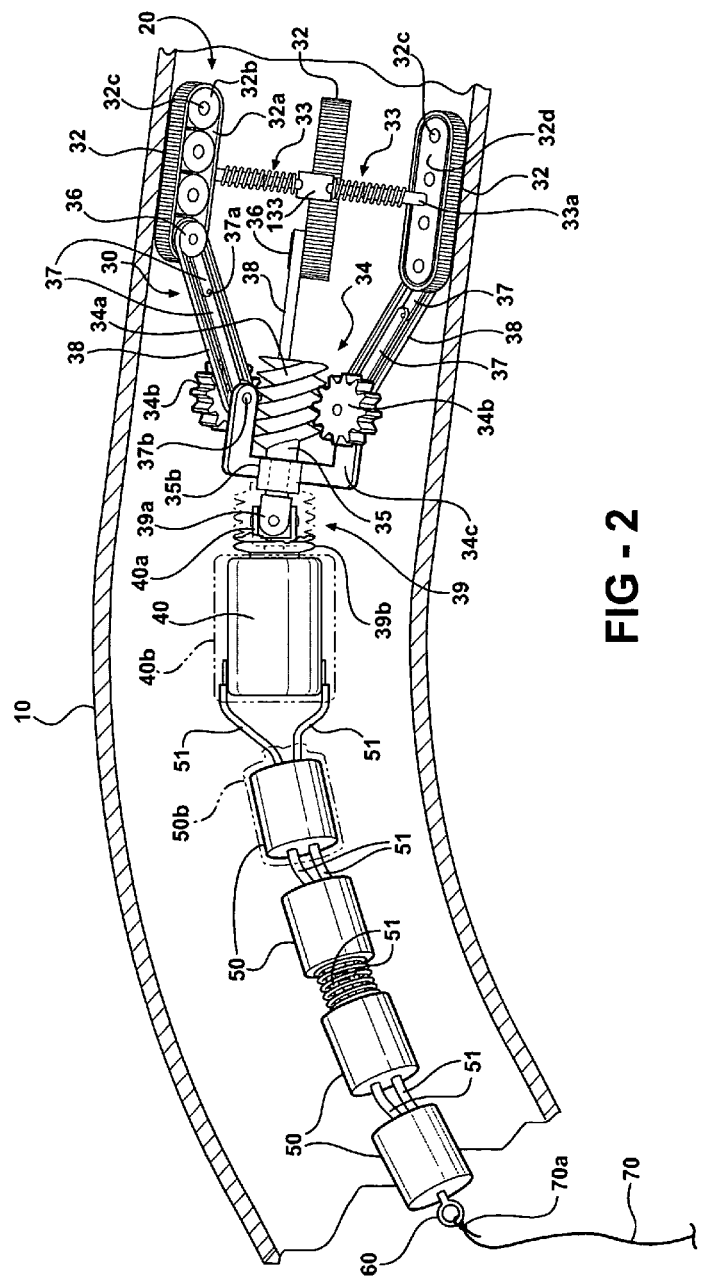
FIG. 2 is similar to FIG. 1, but shows a preferred, detailed embodiment of a crawler apparatus according to the invention.

Referring next to FIG. 2, crawler 20 is illustrated in its currently preferred form. Traction head 30 includes three equally-spaced coaxial tracks 32 biased apart into constant engagement with the inner wall of conduit 10 by spring-loaded struts 33 bearing against one another in balanced fashion at a central connection or support 133, which could be a direct connection of the inner ends of the struts, or a connection of the struts to a distinct support structure. Tracks 32 are simultaneously driven to rotate at equal speed in a direction to pull traction head 30 through conduit 10 in the direction of the arrow. In the illustrated example, each track 32 includes a rubber-type endless caterpillar tread 32a riding around a row of wheels 32b, the wheels rotationally supported by shafts 32c on a carriage plate 32d that gives the track its structure. It will be understood that the force biasing tracks 32 against the inner wall of the conduit can be achieved in different ways, although the illustrated use of spring members is currently preferred.

The driving force for tracks 32 is supplied by a small DC electric motor 40 of known, commercially available type, coupled to a track drive mechanism 34 on traction head 30 by a rotating U-joint 39. The motor drive shaft terminates in a rotating U-joint coupling 40a connected to a mating, rotating U-joint coupling 39a connected to a central worm drive shaft 35 journaled at its rearward end in fixed bearing sleeve 35b at the base of drive yoke 34c. Worm shaft 35 includes or supports a worm 34a, so that worm 34a is rotated by motor 40 acting through U-joint 39. Worm 34a is in driving engagement with three worm gears 34b mounted to rotate on three equally spaced arms of yoke 34c. Each worm gear 34b has a hub supporting one end of a track link arm 37 and one end of a belt 38. The other ends of each link arm 37 and belt 38 are connected to a corresponding one of tracks 32, preferably via a grooved drive hub 36 extending off the rear (drive) wheel 32b of the track 32. Link arms 37 maintain the spacing of tracks 32 from drive 34, pivoting at connecting pins 37a and 37b when irregularities or curves are encountered in the conduit wall. Belts 38, in the illustrated embodiment durable, high strength rubber bands, transfer the rotation of worm gears 34b to drive hubs 36 to rotate tracks 32.

It might be desirable to bias motor 40 and traction head 30 toward each other as the crawler 20 travels through the conduit, particularly when going around curves. In the illustrated embodiment a coil tension spring 39b coaxially surrounds coupling 39 to apply a constant force tending to draw the motor and crawler head into coaxial alignment after a turn is negotiated, and further to ensure good transfer of power from the motor to the traction head. Similar springs could also be added to the electromechanical couplings 51 between the motor 40 and power supply elements 50.

Figure 3:
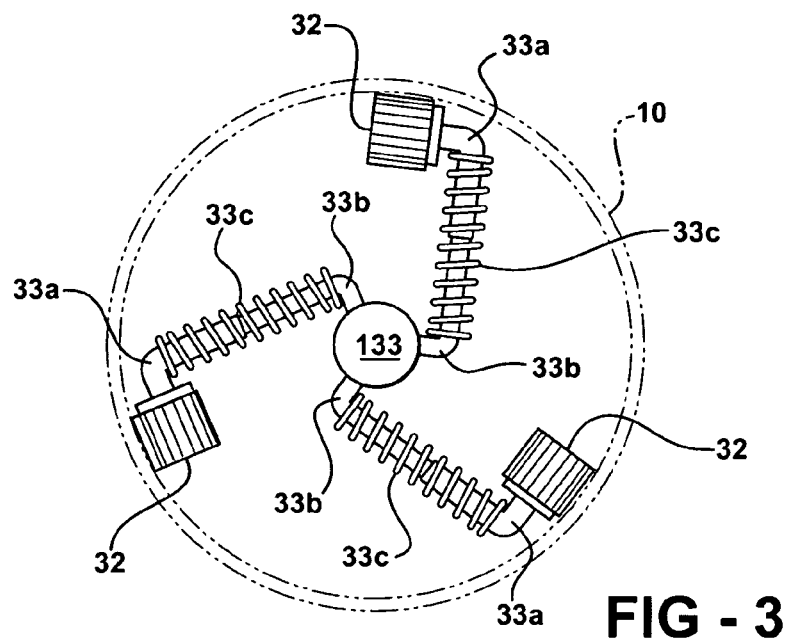
FIG. 3 is a front-end view of the track portion of the crawler traction head from FIG. 2, with the conduit wall in phantom.
Figure 4:
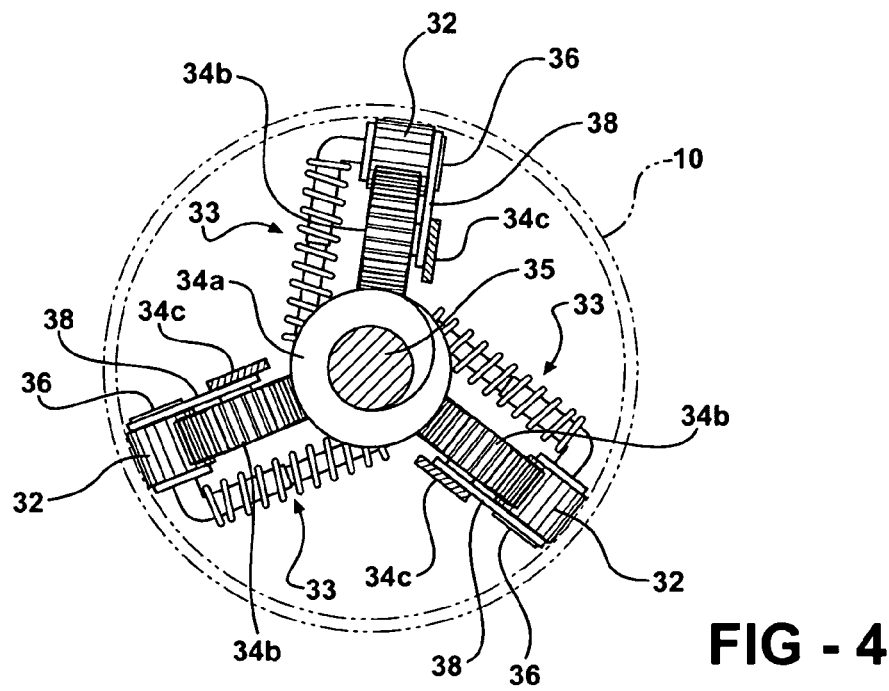
FIG. 4 is a rear-end view of the crawler traction head from FIG. 2, with the conduit wall in phantom.
Figure 5:
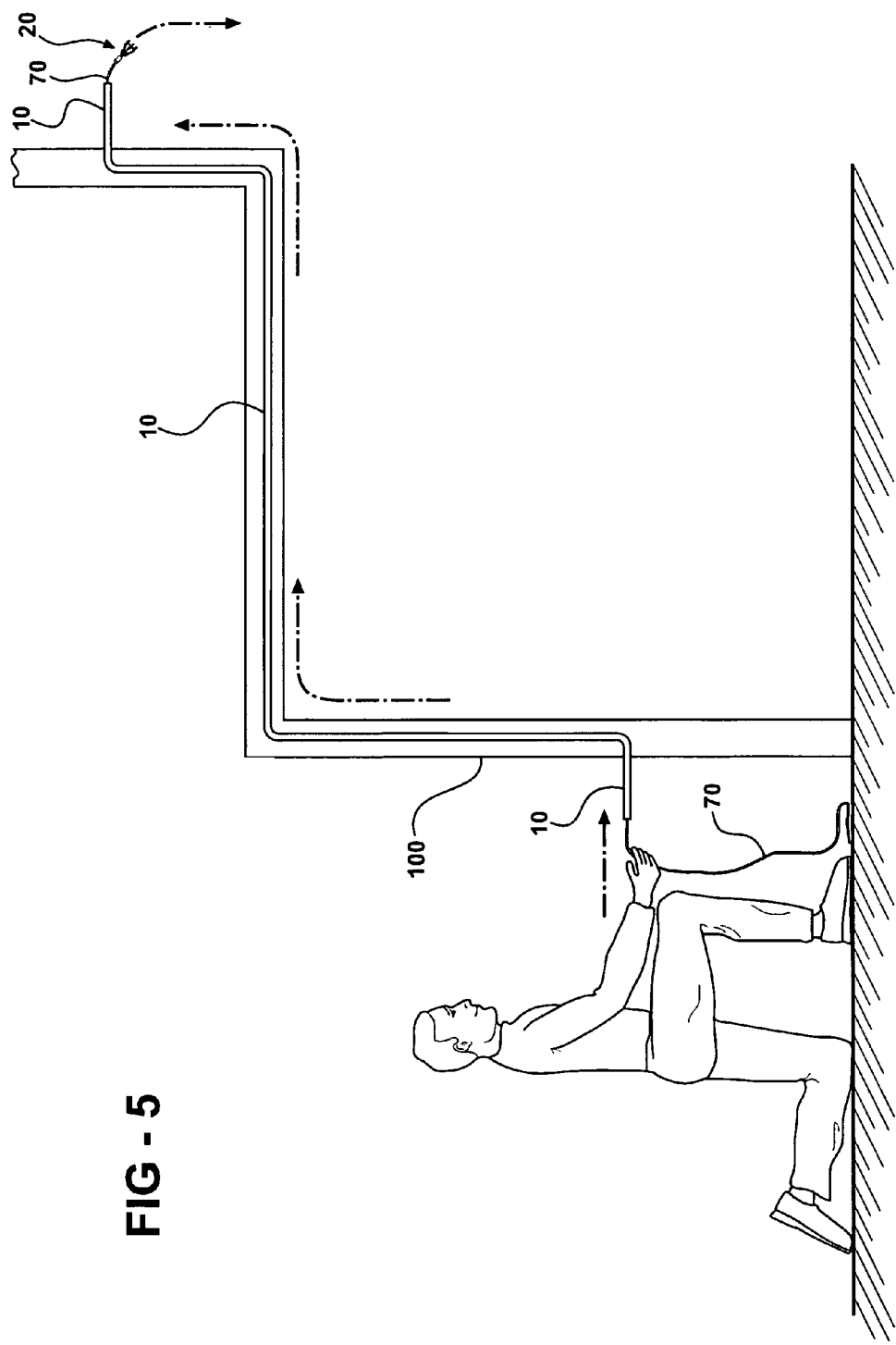
FIG. 5 is a perspective view of an electrician using the crawler of FIG. 2 to pull a leader string through an electrical conduit.

FIGS. 3 and 4 illustrate the details of the drive and support connections between tracks 32 and drive 34 from front and rear end views. In particular they illustrate the tractive connection between the tracks 32 and the inside wall of conduit 10, and the radial spring forced exerted by struts 33 against their common axis to keep the tracks 32 in constant contact with the conduit wall.

Figure 6:
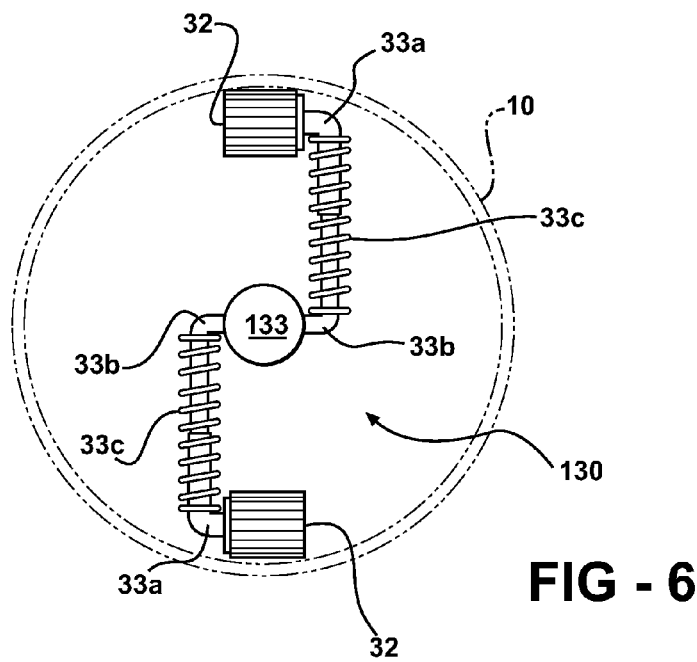
FIG. 6 is similar to FIG. 3, but shows a front-end view of a modified track portion of the crawler traction head with two tracks.
Figure 7:
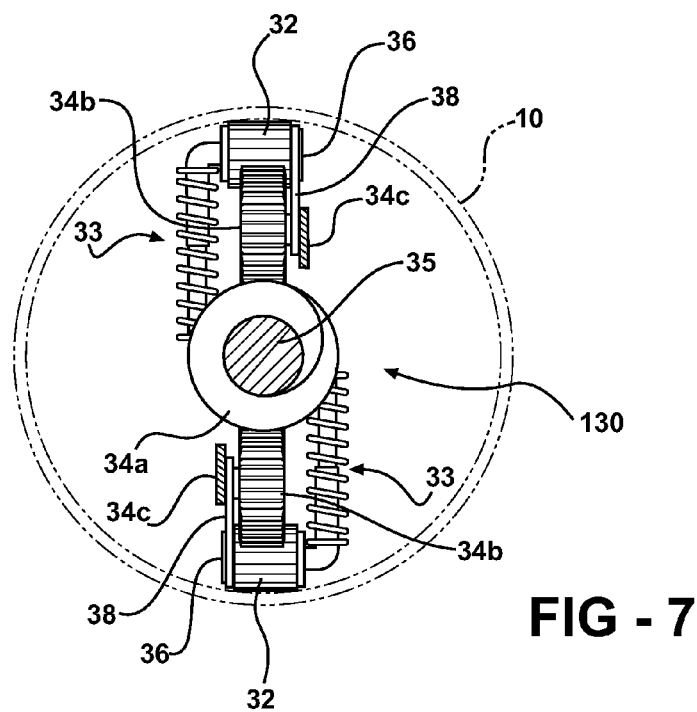
FIG. 7 is similar to FIG. 4, but shows a rear-end view of the modified track portion of the crawler traction head from FIG. 6 with two tracks.

FIGS. 6 and 7 show front and rear end views of a modified traction head 130, identical in all respects to the structure illustrated in FIGS. 3 and 4, except that two tracks 32 are used instead of three tracks.

Referring back to FIG. 2, motor 40 pulls its own independent power supply 50 behind it, train-like, in the preferred form a linked series of batteries 50 connected both electrically and mechanically in series at 51 by suitably strong insulated electrical wire. It will be understood that while electrical wire alone is sufficient to keep the batteries 50 coupled to one another and to the motor 40, it is possible to provide a separate mechanical connection between the batteries to relieve strain on the wiring. It will also be understood that while a train of multiple, serially-connected, relatively short-bodied batteries is illustrated as being the optimal arrangement for providing suitable DC voltage for motor 40 while negotiating the curves of the conduit, it would be possible to use a single battery to power motor 40 if the battery's voltage is high enough for the motor, and if the battery's length is short enough to negotiate the curves encountered in conduit 10.

Crawler 20 preferably has a simple on/off control switch, schematically shown at 41 on a casing 40b around the motor 40 or directly on the motor housing (or anywhere else along the crawler "train"). Turning the switch to "on" supplies battery power to motor 40, which in turn begins rotating treads 32 through linkage 39 and drive 34. The rotational direction in this simple, preferred on/off embodiment is in a single direction, so that the crawler is placed in conduit 10 and released to drive itself through to the other end. It will be understood that it would also be possible to provide more sophisticated controls to motor 40, for example to reverse the motor and/or to adjust its speed, for example using known remote controls of the type used in radio-controlled toys.

The crawler 20 is thus a fully and independently mobile machine, carrying its own power supply in the manner of a self-contained train without the need to trail power or control wiring behind it. It will be understood, however, that power or control wiring that remains connected to the crawler 20 would be possible, although not preferred, as it would add weight and increasing drag to the relatively small crawler as it traveled through the conduit.

FIG. 2 shows optional protective casings or shrouds 40b and 50b around motor 40 and at least one of batteries 50. This could be, for example, a heat-shrunk flexible plastic material to seal the motor and batteries (and optionally the wiring between them) from dust and water that might be encountered in the conduit, or on the worksite outside the conduit.

FIG. 2 shows leader string attachment point 60 as a simple eye-hook, attached directly to the last battery 50 in the crawler train. As noted above, the form of attachment point 60 can vary, and the manner of its connection to the end of the crawler train can likewise vary, including but not limited to direct and indirect attachments to the batteries or to any casings such as 40b around the batteries. It would also be possible to connect attachment point 60 to a more forward part of crawler 20, although the end-mounting is preferred to prevent interference between the leader string and the crawler.

FIG. 2 does not show an optional gear reduction transmission between the motor 40 and the traction head 30, but those skilled in the art will readily be able to find commercially and/or build such gear reduction transmissions if the drive ratio of motor 40 would benefit for a particular use.

It will finally be understood that the disclosed embodiments are representative of presently preferred forms of the invention, but are intended to be explanatory rather than limiting of the invention. Reasonable variation and modification of the invention as disclosed in the foregoing disclosure and drawings are possible without departing from the scope of the invention. The scope of the invention is defined by the following claims.

What is claimed is:

1. A device for pulling a leader string through a wire or cable conduit, comprising:
    a powered tractor device sized to fit inside a conduit, the tractor device comprising a traction head comprising two or more opposed drive tracks spaced apart with a bias adapted to force them outwardly into contact with opposed sides of an inner wall of a conduit when the tractor device is in a conduit, a motor connected to operate the drive tracks to pull the tractor device through a conduit, and a power supply connected to operate the motor, the entirety of the tractor device capable of traveling through a conduit, the tractor device further comprising an attachment point for attaching a leader string to the tractor device such that the tractor device is capable of pulling the leader string through a conduit.

2. The device according to claim 1, wherein the motor and power supply are flexibly coupled with a flexible coupling to the traction head to be pulled behind the traction head.

3. The device according to claim 2, wherein the power supply comprises a battery.

4. The device according to claim 2, wherein the motor and the power supply are separate and are connected serially behind the traction head with flexible couplings.

5. The device according to claim 4, wherein one or more of the flexible couplings comprises a tension spring biasing portions of the tractor device coupled by the spring into coaxial alignment.

6. The device of claim 1, wherein the traction head comprises three opposed drive tracks equally spaced about a central axis.

7. The device of claim 4, wherein the motor is connected to the traction head with a flexible drive coupling.

8. The device of claim 7, wherein the motor is connected to the traction head through a separate drive mechanism connected with flexible drive couplings between the traction head and the motor.

9. The device of claim 7, wherein the flexible drive coupling further comprises a spring surrounding a rotating drive element, the spring tending to draw the traction head and the motor together.

10. The device of claim 1, wherein the drive tracks are spaced apart with a spring bias.

11. The device of claim 1, wherein the drive tracks are spaced apart with a bias adapted to force them outwardly into essentially constant contact with opposed sides of an inner wall of a conduit when the tractor device is in a conduit.

* * * * *